United States Patent [19]

Tanaka et al.

[11] Patent Number: 5,268,807
[45] Date of Patent: Dec. 7, 1993

[54] TAPE CASSETTE HAVING IMPROVED HEAD HOUSE REGION

[75] Inventors: Kimio Tanaka; Shinichi Sato, both of Saku, Japan

[73] Assignee: TDK Corporation, Tokyo, Japan

[21] Appl. No.: 706,277

[22] Filed: May 28, 1991

[30] Foreign Application Priority Data

May 29, 1990 [JP] Japan ............................. 1-55326[U]

[51] Int. Cl.⁵ .......................................... G11B 23/087
[52] U.S. Cl. ................................................. 360/132
[58] Field of Search ................ 360/132, 133; 242/199

[56] References Cited

U.S. PATENT DOCUMENTS

| | | | |
|---|---|---|---|
| 4,689,702 | 8/1987 | Oishi et al. | 360/132 |
| 4,799,120 | 1/1989 | Sakai et al. | 360/132 |
| 4,825,320 | 4/1989 | Oishi et al. | 360/132 |
| 5,086,363 | 2/1992 | Katagiri et al. | 360/132 |

FOREIGN PATENT DOCUMENTS

60-98181 7/1985 Japan .

*Primary Examiner*—Robert S. Tupper
*Attorney, Agent, or Firm*—Wood, Phillips, VanSanten, Hoffman & Ertel

[57] ABSTRACT

A tape cassette having a head-receiving housing region provided with an independent guide block which contains a plurality of tape guides, further comprises a pair of thick spacer plate members disposed, respectively, between the guide block and the upper and lower half housing sections of the cassette. The spacer plate members are made of a material suitably chosen from among metals, metal-plastics composites, carbon fibers, glass fibers, composite reinforced plastics containing mica or other reinforcements, and the like. They have a plurality of irregularly shaped apertures or positioning apertures each which receive posts formed in one piece with the upper and lower half housing sections of the cassette and are fixed in position with the posts by caulking. The guide block has portions with which to press the thick spacer plate members securely against the respective half housing sections of the cassette.

9 Claims, 6 Drawing Sheets

TAPE CASSETTE HAVING IMPROVED HEAD HOUSE REGION

BACKGROUND OF THE INVENTION

This invention relates to the structure of a head house region of a magnetic tape cassette.

A magnetic tape cassette has in its front part a head house region, so called because it admits the head, along with capstans, pinch rollers, and other elements for driving the tape, of a recording-playback apparatus into the cassette space where the tape runs. The head house region usually includes a plurality of tape guide groups arranged symmetrically with respect to the centerline of the magnetic tape cassette and formed integrally with the half housing sections of the cassette to ensure stable running of the tape. With improvements in performance of magnetic tape cassettes in recent years, vibrations that result from the frictional contact between the tape guides and the tape and are thence transmitted to the tape, have attracted growing attention as a cause of increased modulation noise. In an effort to solve this problem and thereby reduce the modulation noise and achieve phase stabilization, it has already been proposed, as shown in FIG. 5, to form all of the plurality of tape guides 1a-1f in an independent one-piece guide block 1. The guide block 1 of the construction does accomplish both the reduction of modulation noise and the phase stabilization at which the present invention is aimed. However, as is clear from FIG. 5, the construction eliminates integral ribbing from the lower half housing section 3 and also from the upper half housing section (of a similar construction not shown) over a fairly large percentage of the longitudinal dimension of the magnetic tape cassette. This results in inadequate strength of the lower and upper half housing sections against warping during fabrication, adversely affecting the parallelism of the two half housing sections. It might appear possible to remedy the shortcoming by increasing the thickness of the base plate of the head house region up to the space (tape-accommodating space) inside the half housing section until sufficient rigidity is secured. In fact, it would necessitate a base plate as thick as 3.5 mm. Such a thick plate would cause sink, not only presenting appearance and dimensional problems but also extending the cooling time after injection molding, with consequent increases in both overall time period of molding cycle and production cost.

SUMMARY OF THE INVENTION

The present invention thus has for its object to provide a tape cassette having a head house region of a structure that imparts adequate rigidity to the cassette while preventing the sinking and prolongation of molding time.

The invention provides a tape cassette having a head house region provided with an independent guide block which contains a plurality of tape guides, characterized in that a pair of thick spacer plate members are disposed, respectively, between the guide block and the upper and lower half housing sections of the cassette.

The thick spacer plate members are made of a material suitably chosen from among metals, metal-plastics composites, carbon fibers, glass fibers, composite reinforced plastics containing mica or other reinforcements, and the like. They have a plurality of irregularly shaped apertures or positioning apertures each which receive posts formed in one piece with the upper and lower half housing sections of the cassette and are fixed in position with the posts by caulking. The guide block has portions with which to press the thick spacer plate members securely against the respective half housing sections of the cassette.

With the construction described, the present invention solves the foregoing problems of the prior art. The base plate of the head house region can be formed thin and uniform without posing any rigidity problem. The use of such a thin base brings important effects upon the maintenance of initial characteristics of magnetic tapes. To be more exact, it helps achieve maximum functional effects including the prevention of sinking and therefore of defective outward appearance, and improvement in surface flatness and parallelism of the cassette.

DESCRIPTION OF THE PREFERRED EMBODIMENTS

Figure 6:
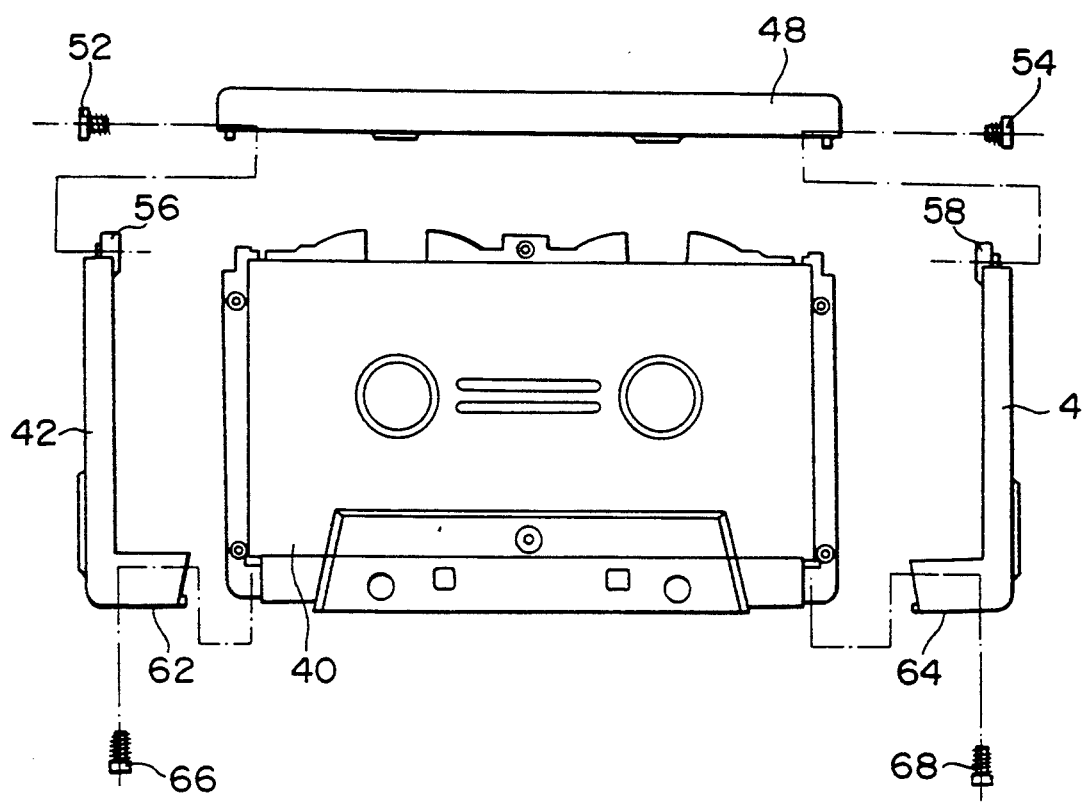
FIG. 6 is an exploded plan view of the tape cassette provided with the balance weight according to the present invention.
Figure 7:
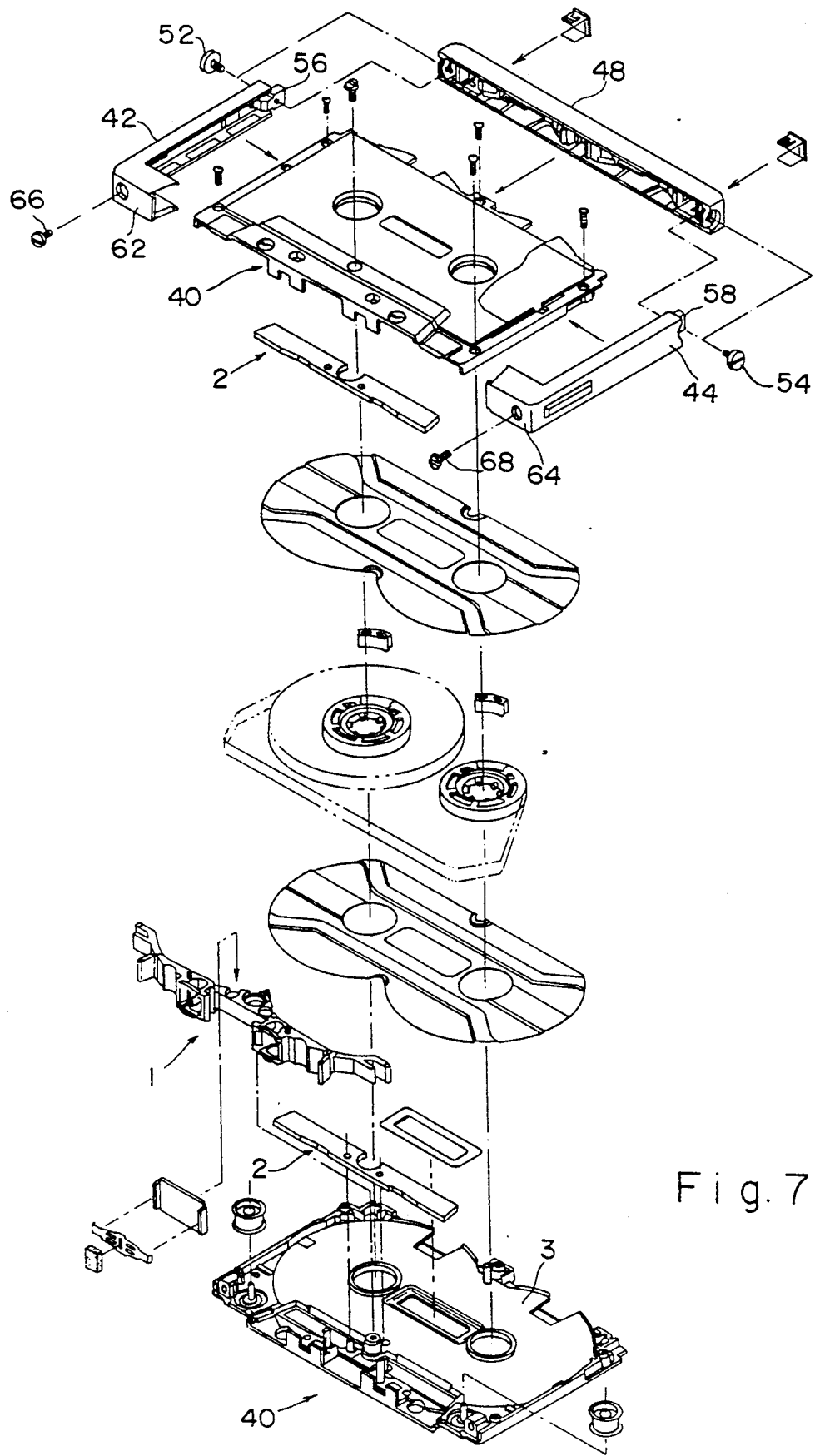
FIG. 7 is an exploded view of the cassette body of the embodiment shown in FIG. 6.

Referring to FIGS. 6 and 7, there is illustrated, in an exploded view, a magnetic tape cassette including a pair of side frame members 42, 44. The cassette has a rear frame member 48 which is formed with tape type detecting openings (not shown) fitted to the rear end of the cassette body. The part of the magnetic tape cassette extending from the front end to the edge adjoining the rear frame member constitutes the main body 40 of the cassette. The main body 40 is made up of upper and lower half housing sections to accommodate a pair of hubs on which a length of magnetic tape is wound and also tape guide rollers and the like (all not shown). The individual frame members are attached to the main body, typically by first fitting the both side frame members 42, 44 to the corresponding sides of the main body 40 and then fitting the rear frame member 48 to the rear end of the body 40. Fastener means such as screws 52, 54 are inserted, respectively, through holes formed in both sides of the rear frame member 48 and through holes formed in rear extensions 56, 58 of the side frame members 42, 44, into holes formed in the corresponding portions of the main body 40, and are tightened so as to secure the rear frame member 48 and the rear extensions of the side frame members 42, 44 to the body 40.

Front end portions 62, 64 of the side frame members may be partly bent, as shown in FIGS. 6 and 7 to form front end portions of the magnetic tape cassette. Like the rear extensions 56, 58, the front end portions 62, 64 are fastened, respectively, by screws 66, 68 to the main body 40.

Figure 1:
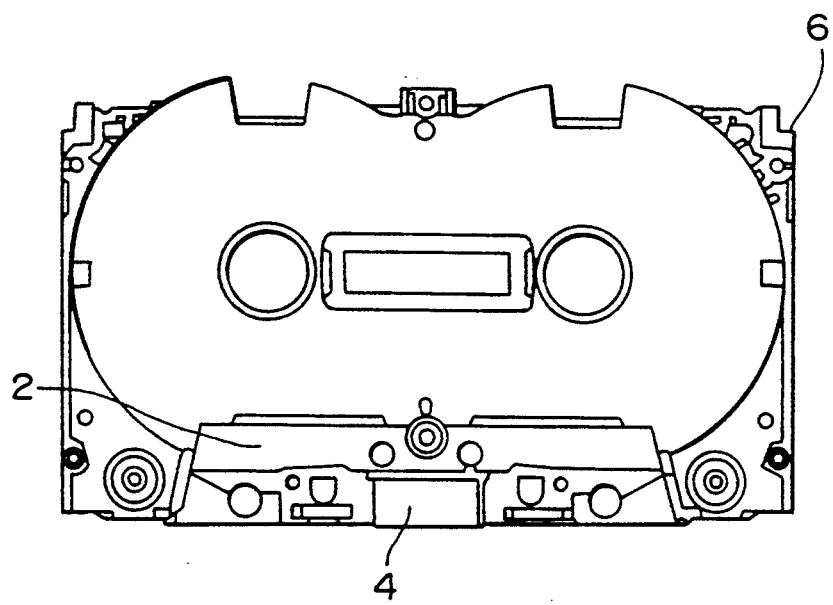
FIG. 1 is a plan view of the lower half housing section of a magnetic tape cassette provided with a head house region incorporating a balance weight according to the present invention.

FIG. 1 illustrates, in a plan view, the lower half housing section 6 of a magnetic tape cassette provided with a head house region 4 incorporating a balance weight 2 in accordance with the invention. The balance weight 2, as shown, is fitted in the entirety of a similarly shaped recess 8 formed partially with respect to the centerline of the head house region 4. It has a thickness chosen to be slightly less than the depth of the recess 8 in the head house region 4, as will be described later. The balance weight 2, as better shown in FIGS. 2 and 7, has a horseshoe opening 12 formed midway to receive a post or boss 10 of the lower half housing section 6 formed in one piece with the latter for fastening with a screw. Longitudinally of the balance weight, there are formed a pair of irregularly shaped apertures or positioning apertures 16 at points opposite to each other with respect to the opening 12 in the center so as to receive a pair of positioning posts 14 also formed in one piece with the lower half housing section 6. When the positioning apertures 16 are to be utilized in fixing the balance weight to the lower half housing section 6 by caulking using an ultrasonic or thermal welding technique, the apertures are formed beforehand with a plurality of slits 18 each at regular intervals, as shown on an enlarged scale in FIG. 3. Subsequent insertion of the positioning posts 14 into the positioning apertures 16 and caulking will enable molten material to fill up the slots 18, eliminating any play at the joints. Provision of these slits 18 is not essential but is preferable when the fixing is to be done by means of ultrasonic welding, face-to-face bonding or both.

Figure 2:
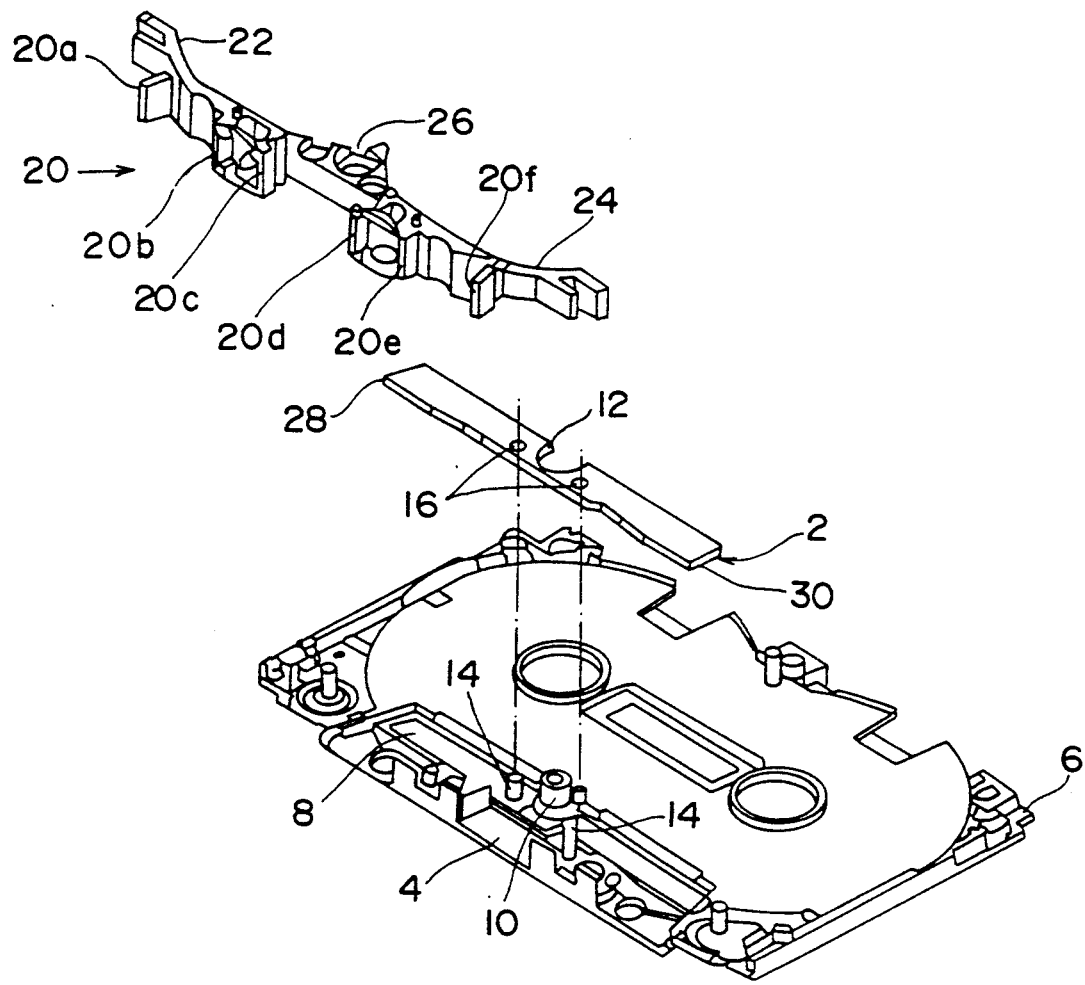
FIG. 2 is an exploded view illustrating how the balance weight of the invention is associated with the lower half housing section and a guide block.
Figure 3:
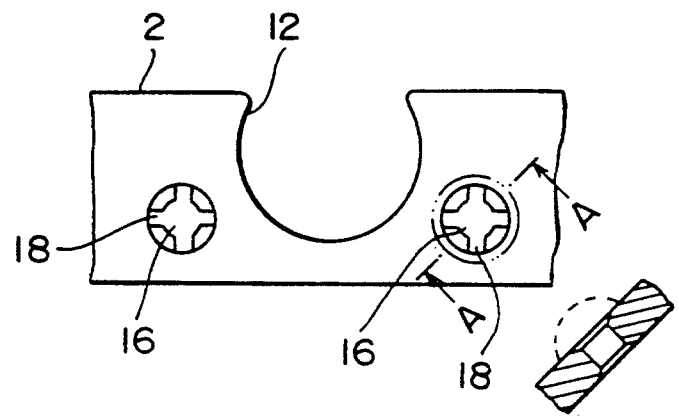
FIG. 3 is a fragmentary plan view of a central portion of the balance weight according to the invention.
Figure 4:
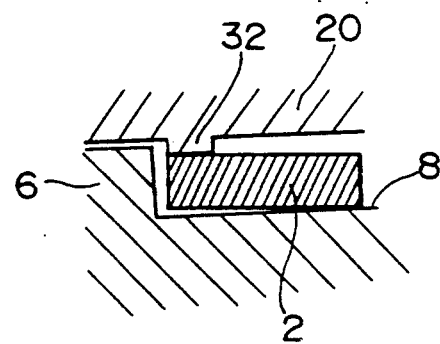
FIG. 4 is a fragmentary sectional view showing a typical way of securing the balance weight of the invention in position by the guide block.
Figure 5:
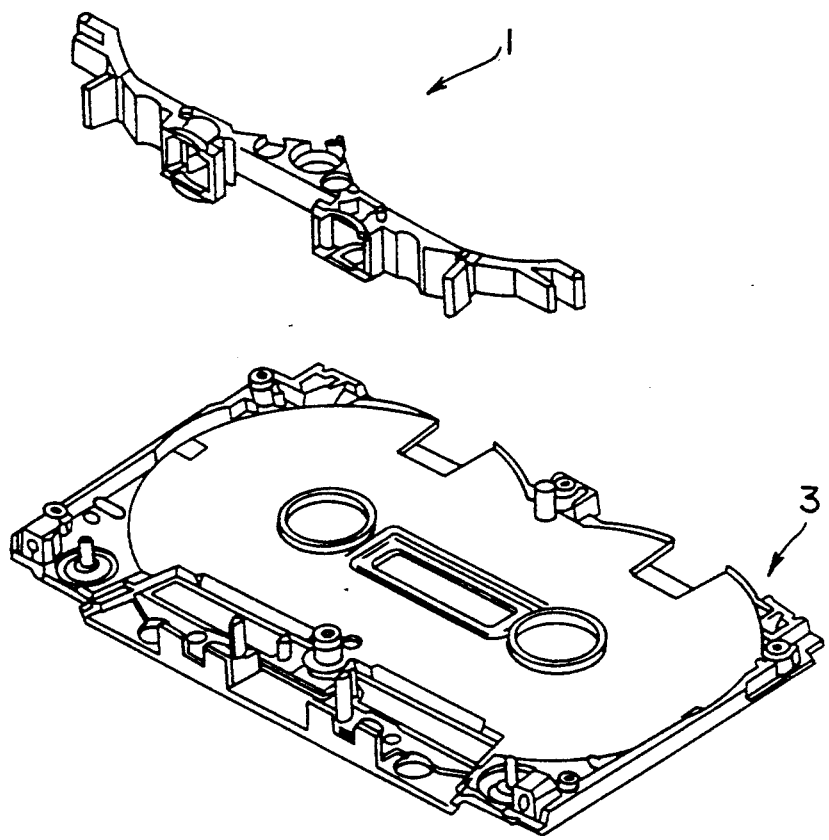
FIG. 5 is an exploded view of a conventional magnetic tape cassette having a one-piece guide block.

Following the incorporation of the balance weight 2, a guide block 20 similar to the guide block 1 already explained in connection with the prior art is fitted in position so as to cover part of the balance weight 2. The guide block 20, analogous in construction to that which is shown in FIG. 2, comprises a pair of legs 22, 24 integrally joined midway, the legs having groups of tape guides 20a-20c and 20d-20f, respectively, arranged symmetrically with respect to the middle portion of the block. The middle portion has a center hole 26 which receives the boss 10 provided at the center of the head house region 4 of the lower half housing section 6 during assembling. into a magnetic tape cassette. The legs 22 and 24 are symmetrically arranged with respect to the center hole 26 formed in between. They have step-like protrusions 32 (FIG. 4) at the bottom to come in contact with the longitudinal end portions 28, 30 of the balance weight 2. These protrusions 32 are so formed that their height is substantially the same as the difference between the depth of the recess 8 and the height of the balance weight 2. The protrusions thus press the balance weight, even one originally warped or otherwise deformed by machining, against the bottom of the recess 8 in a proper state. In this way they help the whole head house region 4 attain a rigidity improved as desired.

Although a preferred embodiment of the invention has thus far been described in connection with the lower half housing section 6 of a magnetic tape cassette, it is to be noted that the upper half housing section (not shown) is likewise provided with another balance weight of the same contour which too is secured in position, like the afore-described balance weight 2, by the same guide block 20.

While the invention has been described with reference to preferred embodiments thereof, it will be understood by those skilled in the art that various changes and modifications may be made without departing from the spirit and scope of the invention.

What is claimed is:

1. A tape cassette having a head-receiving housing region provided with an independent guide block which contains a plurality of tape guides, the cassette having upper and lower half housing sections, the tape cassette including first and second thick spacer plate members, the first thick spacer plate member being disposed between the guide block and the upper half housing section of the cassette and the second thick spacer plate member being disposed between the guide block and the lower half housing section of the cassette.

2. The tape cassette according to claim 1 wherein the thick spacer plate members are made of a material chosen from among metals, metal-plastics composites, carbon fibers, glass fibers, or composite reinforced plastics containing mica, composite reinforced plastics containing other reinforcements.

3. The tape cassette according to claim 1 wherein the thick spacer plate members have a plurality of positioning apertures each which receive posts formed in one piece with the upper and lower half housing sections of the cassette and are fixed in position with the posts by caulking.

4. The tape cassette according to claim 1 wherein the guide block has portions with which to press the first thick spacer plate member securely against the upper half housing section of the cassette and to press the second thick spacer plate member securely against the lower half housing section of the cassette.

5. A tape cassette having a head-receiving housing region provided with an independent guide block that contains a plurality of tape guides, the cassette having upper and lower half housing sections, the tape cassette including comprising a spacer plate member disposed between the guide block and one of the upper and lower half housing sections.

6. The tape cassette according to claim 5 wherein the spacer plate member is made of a material chosen from among metals, metal-plastics composites, carbon fibers, glass fibers, composite reinforced plastics containing mica, or composite reinforced plastics containing other reinforcements.

7. The tape cassette according to claim 5 wherein the spacer plate member has a plurality of positioning apertures each which receive posts formed in one piece with the one of the upper and lower half housing sections of the cassette and are fixed in position with the posts by caulking.

8. The tape cassette according to claim 5 wherein the guide block has portions with which to press the spacer plate member securely against the half housing section.

9. The tape cassette in accordance with claim 5 further comprising a second spacer plate member disposed between the guide block and the other of the upper and lower half housing sections.

* * * * *